United States Patent Office 3,334,139
Patented Aug. 1, 1967

3,334,139
PRODUCTION OF TRIMETHYLAMINE-SULFUR
TRIOXIDE COMPLEX
Jacob Rosin, Maplewood, N.J., assignor to Baldwin-Montrose Chemical Company, Incorporated, a corporation of Indiana
No Drawing. Filed Jan. 31, 1964, Ser. No. 341,763
4 Claims. (Cl. 260—583)

This invention relates to a process of making the complex of trimethylamine and sulfur trioxide. This complex is useful in the ultimate formation of cyclohexylsulfamic acid and its salts, as is taught in application Ser. No. 310,127, filed Sept. 19, 1963, as well as for other purposes.

The complex of trimethylamine and sulfur trioxide is generally prepared in a liquid phase in an inert solvent. Preparation in gas phase in the presence of an inert gas carrier is also known but is not used because the product so obtained is not pure due to oxidative side reactions resulting in tarry by-products.

It has now been found that a very pure product can be obtained in practically quantitative yield if the dilution of $SO_3$ by a neutral gas carrier is such that $SO_3$ is kept over its dew point at the given temperature, as long as this temperature is below 33° C. Thus, for instance, at 20° C. the dilution by the neutral gas has to be in the molar ratio of at least 3 moles neutral gas to 1 mole $SO_3$; at 27° C. this minimum molar ratio is 2:1 and at 33° C. the minimum ratio is 1:1. At temperatures higher than 33° C., the minimum ratio is higher than that corresponding to the dew point and, in general, has to be increased with rising temperature. If the temperature of the reaction is over 40° C., the quality of the complex starts to deteriorate, but when using very high dilutions a still acceptable product can be prepared at temperatures as high as 70° C.

Since the reaction between sulfur trioxide and trimethylamine is very exothermic, the reaction temperature can only be maintained if adequate cooling is provided. Providing a heat exchanger for the reaction vessel is not practical due to rapid rate of gas flow and to the tendency of the complex formed to coat the walls and thus create an insulating layer. This problem can be solved by recirculating the neutral gas through a heat exchanger after its separation from the complex formed and using it to dilute the $SO_3$ stream, but I found that much better results were achieved when the cooling was executed internally by injecting a part of the inert gas in liquefied form and thus utilizing its latent heat of vaporization. In this latter case Freons (fluorochloromethanes and ethanes) and many other gases can be used, but an inexpensive inert gas such as $CO_2$ is preferred.

The following non-limiting examples illustrate the preferred embodiment of the invention.

Example I

Into a 5 liter cylindrical reactor with a conical bottom equipped with a very efficient agitator are introduced simultaneously from 3 separate inlets a stream of $CO_2$ in the form of finely divided Dry Ice (obtained by injecting liquid $CO_2$ by connecting the inlet to an inverted $CO_2$ cylinder), a stream of trimethylamine and a stream of $SO_3$ vapor diluted by gaseous $CO_2$. The hourly rates are adjusted as follows: 160 g. $SO_3$ diluted by 176 g. $CO_2$, 120 g. trimethylamine. As to liquid $CO_2$, its rate is so adjusted as to maintain the reaction temperature between 27° C. and 40° C., which requires approximately 1200 g. liquid $CO_2$ per hour. The conical bottom of the reactor is connected to a flask in which the precipitating complex is collected. The top of the reactor is connected to a series of traps and a filter to retain entrained complex. The $CO_2$ gas effluent can be condensed and reused.

Example II

About equimolar amounts of trimethylamine and $SO_3$, the latter diluted by an approximately double volume of nitrogen, are introduced tangentially through separate openings in a cyclone-type separator provided with an efficient agitator. The complex formed is collected in a container attached to the bottom of the cyclone separator. Nitrogen is withdrawn from the top of the separator through a series of traps and a filter into a heat exchanger cooled by water and from there it is pumped into the $SO_3$ vapor stream before it is returned to the cyclone separator. The rate of pumping and cooling is so adjusted as to maintain the reaction temperature below 40° C.

I claim:
1. The production of trimethylamine-sulfur trioxide complex wherein the reaction is conducted as a gas phase reaction in which $SO_3$ vapors are diluted with an inert gas in such proportion as to keep it over its dew point at the reaction temperatures below 33° C. and over 1:1 molar ratio for temperatures over 33° C.
2. The process in accordance with claim 1 in which the cooling is provided by the injection of at least a portion of the inert gas in liquid form.
3. The process in accordance with claim 1 in which the gas is $CO_2$.
4. The process in accordance with claim 1 in which the temperature is maintained below 40° C.

No references cited.

CHARLES B. PARKER, *Primary Examiner.*

RICHARD L. RAYMOND, *Assistant Examiner.*